H. J. MEENGS.
AIR SUPPLY TANK.
APPLICATION FILED DEC. 27, 1916.
1,254,921.
Patented Jan. 29, 1918.
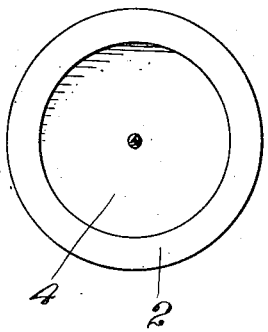
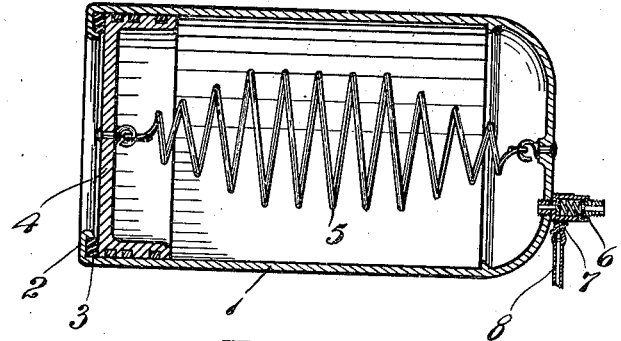
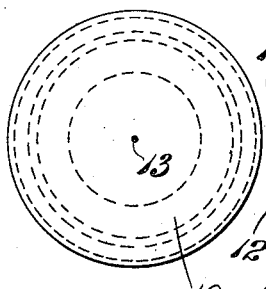
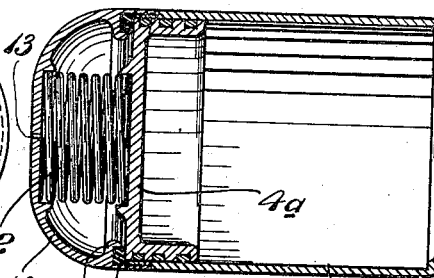
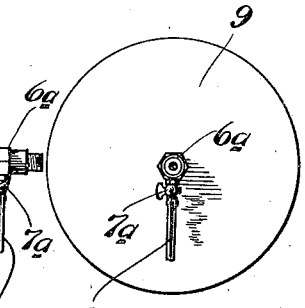
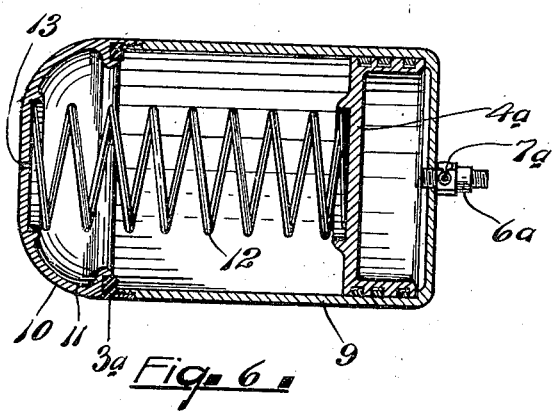
Inventor
Henry J. Meengs.
By Moulton & Luraine
Attorneys.

UNITED STATES PATENT OFFICE.

HENRY J. MEENGS, OF VRIESLAND, MICHIGAN.

AIR-SUPPLY TANK.

1,254,921.   Specification of Letters Patent.   Patented Jan. 29, 1918.

Application filed December 27, 1916. Serial No. 139,229.

*To all whom it may concern:*

Be it known that I, HENRY J. MEENGS, a citizen of the United States of America, residing at Vriesland, in the county of Ottawa and State of Michigan, have invented certain new and useful Improvements in Air-Supply Tanks; and I do hereby declare the following to be a full, clear, and exact description of the invention, such as will enable others skilled in the art to which it appertains to make and use the same.

This invention relates to an air supply tank, it being an object and purpose of the invention to provide a tank which may be carried upon a motor vehicle and used to furnish air for the inflation of the pneumatic tires used with said vehicle. A further object of the invention consists in the provision of a tank of this character from which substantially all of the air may be exhausted working against a relatively high pressure there being provided in the tank a spring operated follower which, as the pressure within the tank reduces, below the strength of the spring, moves the follower lengthwise of the tank and compresses the air ahead of it under the influence of the spring. Many other objects and purposes including various novel details of construction and operation for attaining the same will be apparent with understanding of the invention, reference being had to the accompanying drawings which illustrate the preferred constructions thereof and in which;

Figure 1 is a vertical section taken lengthwise of the tank,

Fig. 2 is an end elevation thereof.

Fig. 3 is a view similar to Fig. 1 of a modified form of construction of the tank.

Figs. 4 and 5 are end elevations thereof and,

Fig. 6 is a view similar to Fig. 3 with the air practically exhausted from the tank.

Like reference characters refer to like parts throughout the several views of the drawings.

Referring to the construction shown in Fig. 1 a cylindrical tank 1 is provided closed at one end as shown, its opposite end having an annular ledge 2 turned inwardly to serve as a seat for a gasket 3, preferably of rubber or like material. A piston-like follower 4 is mounted within the tank and may be provided if desired with suitable packing rings to form a substantially air tight seal between the inner walls of the tank and the sides of the follower. Interposed between the follower and the closed end of the tank is a strong coil spring 5 which, preferably, has its convolutions progressively increasing in diameter from its ends to its middle. The normal tendency of this spring is to draw the followers toward the closed end of the tank. A valve 6 is secured in the closed end of the tank and is of a construction to stop the passage of air from the tank but permitting the entrance of air therein; and below the valve mechanism a branch containing a stop cock 7 is formed which when opened permits the air to pass from the tank through any suitable conduit, such as 8, which may be of rubber hose or the like and which at its end may have a suitable connection for attachment to the valve stem of a pneumatic tire. This, however, forms no part of the present invention and is not illustrated.

The tank is of a strength sufficient to withstand high pressure and it is designed that air from any of the various garage supply tanks may be entered therein through the valve structure at 6. The air supply at such places varies in pressure from 125 to 150 pounds per square inch and as it is entered into the tank, when the pressure reaches more than a certain amount at which the stretching of spring 5 begins, the follower 4 is moved toward the open end of the tank and eventually is pressed tightly against the gasket 3. It will be evident that when so located an absolutely air tight seal is made against the passage of any air beyond the follower and out through the open end of the tank. When a tire is to be inflated the air is allowed to escape by turning the cock 7 and with the diminution of pressure the spring 5 draws the follower toward the closed end of the tank and serves to force out the greater part of the air therein; and by reason of the structure of the spring it may be collapsed into small spaces.

A modification in structure for attaining the same ends is illustrated in Figs. 3 to 6 inclusive, the tank 9 therein having exterior screw threads at its open end for the attachment of a member 10 which may be threaded thereon. Said member is formed with an annular ledge 11 against which the gasket 3ª seats. The follower 4ª is similar in all respects to the follower 4 previously described and between it and the member 10 a strong compression spring 12 is located this spring, as shown in Fig. 6 serving to drive the follower toward the closed end of the tank at which the valve mechanism 6ª with the stop cock 7ª and conduit 8ª attached thereto are placed, said parts being identical in all respects to the parts 6, 7 and 8 previously described. A vent 13 may be made in the member 10 to permit movement of the follower 4ª in either direction.

It will be evident that the operation of this construction is the same as that shown in Fig. 1 except that of compression spring 12 behind the follower serves to operate it as the pressure diminishes, while in Fig. 1 the tension spring 5 in front of the follower is the operating means.

I claim:—

1. In combination, a tank, a follower therein, spring means tending to carry the follower toward one end of the tank, a gasket against which the follower seats when the tank is filled with air under pressure sufficient to overcome the spring, and valve mechanism in said end of the tank for permitting the entrance of air into the tank but normally stopping the escape therefrom, substantially as described.

2. In combination, a tank having an open end, an annular ledge turned inwardly at said open end, a gasket seated against the inner sides of the ledge, a follower movably mounted in the tank, a spring connected to the follower and closed end of the tank, said spring being located within the air chamber of the tank and expanding as air is entered into said chamber, and valve mechanism in said tank for permitting the entrance of air into the tank but normally preventing the escape therefrom, substantially as described.

3. In combination, a tank having an open end, an annular ledge turned inwardly at said open end, a gasket seated against the inner sides of the ledge, a follower movably mounted in the tank, a coiled spring having its coils progressively increasing in diameter connected to the follower and closed end of the tank, and valve mechanism in said closed end of the tank for permitting the entrance of air therein but normally stopping escape of air therefrom, substantially as described.

In testimony whereof I affix my signature.

HENRY J. MEENGS.